UNITED STATES PATENT OFFICE.

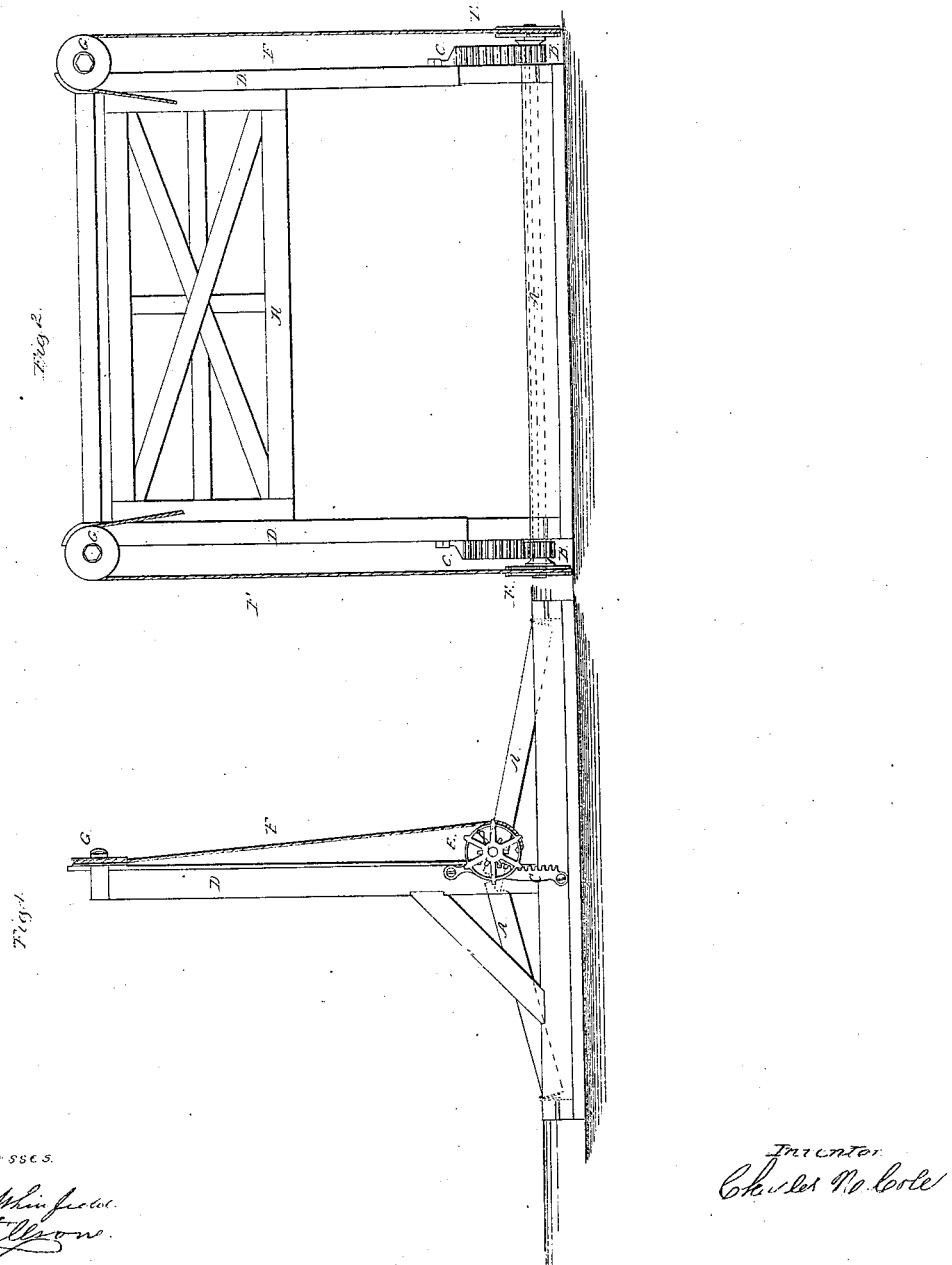

CHAS. N. COLE, OF PLEASANT VALLEY, NEW YORK.

FARM-GATE.

Specification of Letters Patent No. 14,851, dated May 13, 1856.

*To all whom it may concern:*

Be it known that I, CHARLES N. COLE, of the town of Pleasant Valley, county of Dutchess, and State of New York, have invented a new and Improved Mode of Self-Acting or Balance Gate; and I do hereby declare that the following is a full, clear, and exact description of the construction and operation of the same, reference being had to the annexed drawings, making a part of this specification, in which—

Figure 1 is a side elevation when the gate is closed and Fig. 2 is a front elevation when the same is open.

A, the movable platform; B, B, pinions on shafts attached to platform; C, C, racks with cogs and fastened to gate posts; D, D, the gate posts; E, E, wheels or pulleys to wind up the ropes or chains; F, F, the chains or ropes; G, G, pulleys on gate posts; H, the gate.

To enable others skilled in the art to make and use my invention, I will proceed to describe its construction and operation.

I construct my self acting or balance gate by placing on each side of said gate movable platforms (working on hinges or center pins) A, A, connecting with pinions B, B, fixed at each side of said platforms by means of a shaft extending under the same and projecting some distance on each side and working into the racks C, C, and bolted to the gate posts D, D, with cogs matching into said pinions and on the outer end of said shaft are also attached wheels or pulleys E, E, with chains or ropes F, F, fastened to their outer rim and extend up to the top of each gate post or nearly so and return over pulleys G, G, and are then fastened to the upper side of each end of the gate, H, so that by the said combination a person or animal walking onto either platform A, A, depresses the same and operates on the pinions B, B, and wheels E, E, and winding up the ropes or chains F, F, the gate, H, is immediately elevated or opened sufficiently high to allow persons, animals or loaded wagons to pass and immediately on passing through and releasing the platform from their weight the gate will descend to its original position.

What I claim as my invention and desire to secure by Letters Patent is—

The arrangement and combination of the parts forming a self acting or balance gate as fully set forth in the foregoing specification for the purposes above mentioned.

CHARLES N. COLE.

Witnesses:
J. A. JILLSON,
A. M. BRUSH.